(12) United States Patent
Madden et al.

(10) Patent No.: US 11,619,211 B2
(45) Date of Patent: Apr. 4, 2023

(54) WIND TURBINE PITCH BEARING WITH FRICTION ENHANCING INSERT LAYER

(71) Applicant: General Electric Renovables Espana, S.L., Barcelona (ES)

(72) Inventors: Gerard Iain Madden, Leighton Buzzard (GB); Charles Gardner Bouchard, Jr., Schenectady, NY (US); Elizabeth Marie Hood, Greenville, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 224 days.

(21) Appl. No.: 17/085,584

(22) Filed: Oct. 30, 2020

(65) Prior Publication Data

US 2022/0136487 A1 May 5, 2022

(51) Int. Cl.
*F03D 80/70* (2016.01)
*F16C 33/60* (2006.01)
*F16C 19/38* (2006.01)

(52) U.S. Cl.
CPC .......... *F03D 80/70* (2016.05); *F16C 19/381* (2013.01); *F16C 33/60* (2013.01); *F05B 2240/50* (2013.01); *F16C 2360/31* (2013.01)

(58) Field of Classification Search
CPC ...... F16C 19/381; F16C 19/52; F16C 19/545; F16C 33/60; F16C 2223/32; F16C 2223/42; F16C 2360/31; F05B 2240/50
See application file for complete search history.

(56) References Cited

U.S. PATENT DOCUMENTS

| 8,603,273 | B2 | 12/2013 | Eder et al. |
| 9,422,923 | B2 * | 8/2016 | Frank ................ F03D 80/70 |
| 9,523,348 | B2 | 12/2016 | Jacobsen et al. |

FOREIGN PATENT DOCUMENTS

| DE | 102011002913 A1 | 7/2012 |
| DE | 102015200294 | * 7/2016 |

(Continued)

OTHER PUBLICATIONS

3M™ Friction Shims for Wind Energy Applications, 3M Advanced Materials Division, 3M Science Applied to Life, 2 Pages. Retrieved Oct. 21, 2020 from https://multimedia.3m.com/mws/media/1001694O/3m-friction-shims-for-wind-energy-applications.pdf.

(Continued)

*Primary Examiner* — James Pilkington
(74) *Attorney, Agent, or Firm* — Dority & Manning, P.A.

(57) ABSTRACT

A pitch bearing for coupling a rotor blade to a hub of a wind turbine includes an outer race mountable to the hub and an inner race rotatable relative to the outer race and mountable to the rotor blade. The inner race is formed by first and second ring components, each of the first and second ring components having an outer annular face and an inner annular face. The first and second ring components are joined together at the inner annular faces such that the inner annular faces are opposed and opposite each other. A layer of friction enhancing material is inserted/disposed between the opposed inner annular faces, the friction enhancing material including an abrasive particulate component that increases a coefficient of friction to minimize slippage between the first and second ring components.

16 Claims, 5 Drawing Sheets

(56) References Cited

FOREIGN PATENT DOCUMENTS

DE       102015204567 A1    9/2016
EP            0892896 B1    7/2004
WO     WO 2012/069274 A1    5/2012
WO     WO 2020/025094 A1    2/2020

OTHER PUBLICATIONS

Technical Ceramics from 3M, Advanced Materials, High-Performance Ceramics, Germany, 12 Pages. Retrieved Oct. 21, 2020 from http://technical-ceramics.3mdeutschland.de/fileadmin/content/download/produktinformation-EN/PI_friction_shims_wind_energy_e.pdf.
European Search Report for EP application No. 21204203.0, dated Mar. 28, 2022.

* cited by examiner

WIND TURBINE PITCH BEARING WITH FRICTION ENHANCING INSERT LAYER

FIELD

The present subject matter relates generally to wind turbines and, more particularly, to a pitch bearing for a wind turbine that includes a friction enhancing layer between ring components of the bearing.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The wind turbine includes pitch system arranged between a blade root of the rotor blades and the hub to rotate or pitch the rotor blades with respect to the incoming wind. In a particular pitch bearing design, one of the rings is composed of two annular parts. Normally, these parts are held together in the correct relative orientation and position by frictional forces at their interface. This friction is developed by the bolting that holds the bearing on to the blade root or the hub face.

Under certain conditions, for example high wind loading or relaxation of the bolting forces, the friction at the interface of the annular parts may become insufficient. This situation can result in relative sliding between the two annular parts and consequential damage or failure of the bearing or its bolting.

Another consequence of the conventional bearing design is that because the two annular parts of the bearing ring are made from steel or other ferrous-based materials, microscopic movements can normally occur between the two parts (even when there is no macro slipping) and this can result in the formation of fretting corrosion. Fretting corrosion could lead to failure of the interface joint or of the bearing.

Accordingly, a pitch bearing with an improvement to prevent slippage or movement between the annular parts of the ring component to address the aforementioned issues would be welcomed in the industry.

BRIEF DESCRIPTION

Aspects and advantages of the invention will be set forth in part in the following description, or may be obvious from the description, or may be learned through practice of the invention.

In one aspect, the present disclosure is directed to a pitch bearing for coupling a rotor blade to a hub of a wind turbine. The pitch bearing includes an outer race and an inner race. One of the inner race or the outer race is a hub race configured to be coupled to the hub and the other of the inner race or the outer race is a blade race configured to be coupled to the rotor blade. One of the inner race or the outer race is a split race configuration having first and second ring components joined together at opposed annular faces thereof. A friction enhancing interface is provided between the opposed annular faces that increases a coefficient of friction to minimize slippage between the first and second ring components. The friction enhancing interface can be formed by a surface characteristic defined into one or both of the opposed annular faces or a layer of friction enhancing material inserted between the opposed annular faces comprising a particulate component.

In a particular embodiment, the layer of friction enhancing material includes a substrate (e.g. a metal, paper, or plastic substrate) inserted between the opposed inner annular faces, the substrate comprising the particulate component applied to opposite sides thereto (similar to a double-sided sandpaper material).

In an alternate embodiment, the layer of friction enhancing material is a sprayed-on, painted-on, or coated-on layer applied to one or both of the opposed annular faces. For example, any one of a suitable number of commercially available friction coatings that contain abrasive particulates may be sprayed or coated onto the annular surfaces before the components are joined together.

The layer of friction enhancing material may be applied/inserted so as to completely cover the surface area of the opposed annular faces. In an alternate embodiment, the layer of friction enhancing material may be applied/inserted in a discontinuous pattern such that at least a portion of the opposed annular faces is without the friction enhancing material therebetween.

In certain embodiments, the friction enhancing interface is provided by a roughened surface defined into (e.g., machined, laser-etched, grit-blasted, etc.) one or both of the opposed annular faces, the roughened surface comprising peaks and valleys (regular or irregular pattern) that provide the desired degree of increased coefficient of friction.

The split race may be formed by various configurations of the first and second ring components. In a particular embodiment, each of the first and second ring components is an L-shaped component, wherein the annular faces are defined at the end of the legs of the L-shaped components. When joined at the annular faces, the ring components define a channel-shaped cavity for rolling bodies between the inner and outer races. In an alternate embodiment, one of the ring components may be a flat plate while the other ring component is L-shaped. The flat plate is joined to a leg of the L-shaped component to form the channel-shaped cavity.

In a certain embodiment, the opposed annular faces may have a stepped profile with all or a portion of the surfaces thereof covered with the friction enhancing material.

The invention is not limited to which one of the inner race or outer race constitutes the split race, or which of the races constitutes the blade race or the hub race. For example, in one embodiment the inner race is the split race and may be either the hub race or the blade race. Alternatively, the outer race is the split race and may be either the hub race or the blade race.

The present invention also encompasses a wind turbine having one or more rotor blades coupled to a hub via a pitch bearing. The pitch bearing is configured in accordance with any one or combination of the embodiments discussed above.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
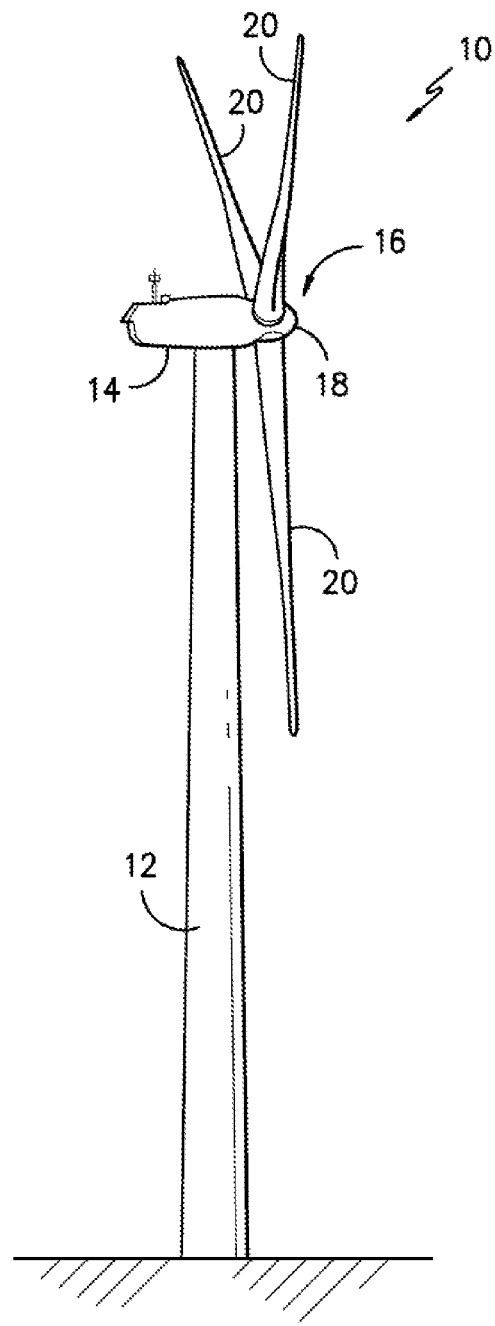
FIG. 1 illustrates a perspective view of one embodiment of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to bearing configurations for a wind turbine. In several embodiments, a pitch bearing of the wind turbine may include first and second rows of line contact rolling elements arranged between inner and outer races of the bearing. It should be appreciated that the disclosed pitch bearings have been uniquely configured to handle the dynamic loading of a wind turbine.

It should also be appreciated that, although the present subject matter will be generally described herein with reference to pitch bearings, the disclosed bearing configurations may be utilized within any suitable wind turbine bearing. For instance, yaw bearings are often subject to dynamic loading during operation of a wind turbine. Thus, the disclosed bearing configurations may also be implemented within the yaw bearing of a wind turbine to reduce stresses within the bearing.

Referring now to the drawings, FIG. 1 illustrates a perspective view of one embodiment of a wind turbine 10 according to the present disclosure. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 25 (FIG. 2) positioned within the nacelle 14 to permit electrical energy to be produced.

Figure 3:
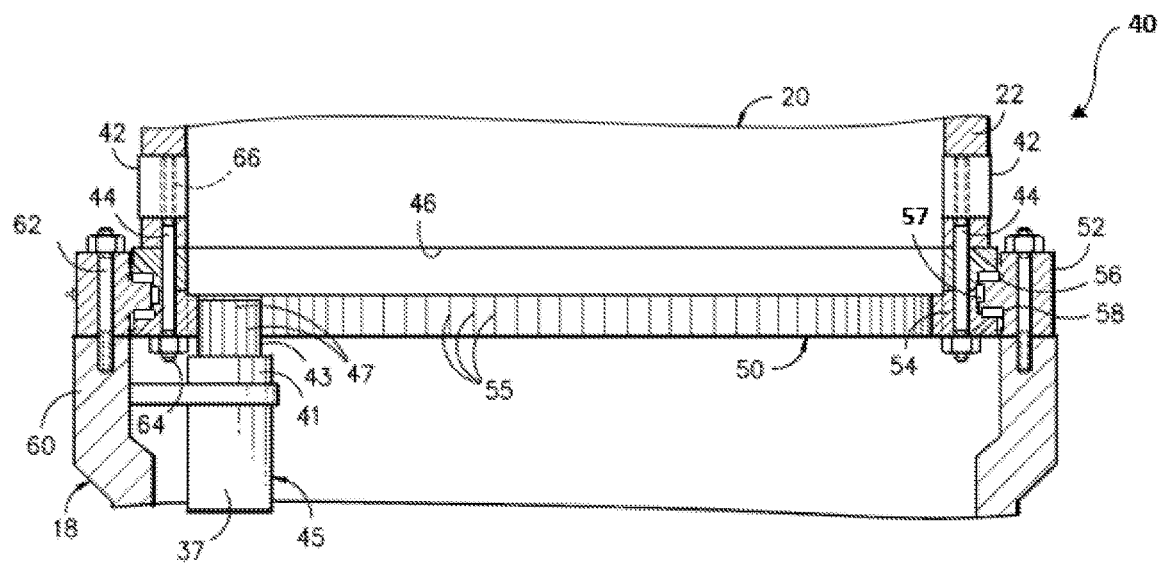
FIG. 3 illustrates one embodiment of a pitch bearing used to couple a blade to a rotor hub.

Referring to FIG. 3, each rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via one of the pitch bearings 50), as will be described in greater detail below.

Figure 2:
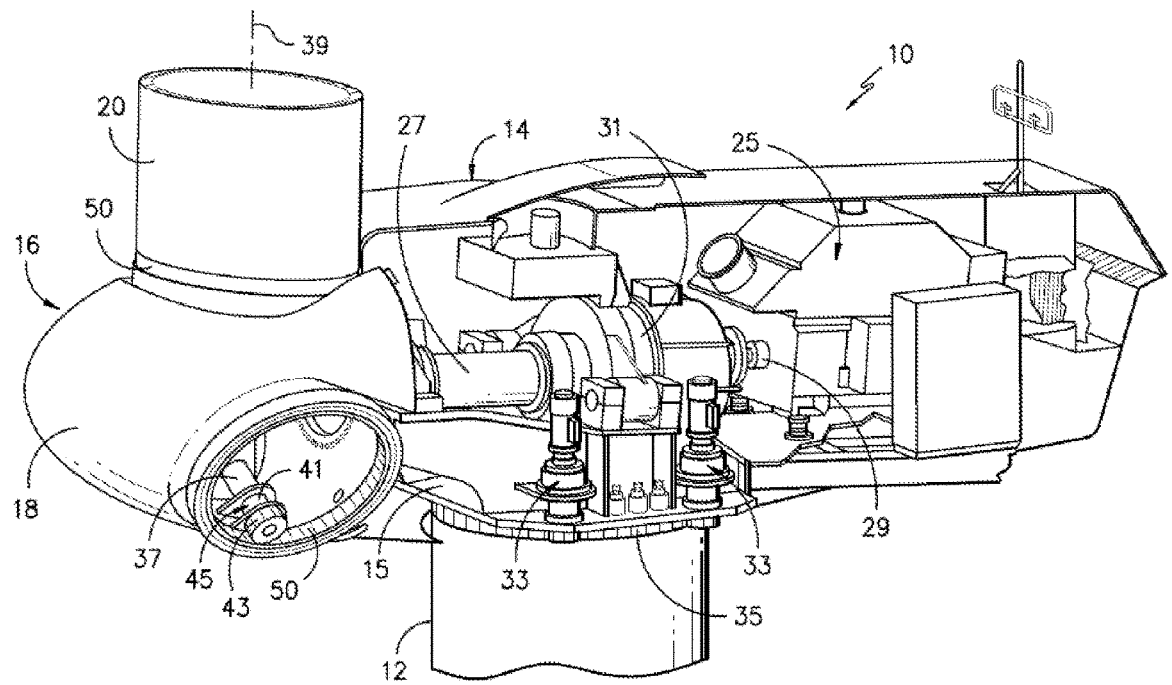
FIG. 2 illustrates a perspective, internal view of the nacelle of the wind turbine shown in FIG. 1.

Referring now to FIG. 2, a simplified, internal view of one embodiment of the nacelle 14 is illustrated. As shown, the generator 25 may be disposed within the nacelle 14 and is coupled to the rotor 16 of the wind turbine 10 for generating electrical power from the rotational energy generated by the rotor 16. For example, the rotor 16 may include a rotor shaft 27 coupled to the hub 18 for rotation therewith, wherein the generator 25 is then be coupled to the rotor shaft 27 via a generator shaft 29 and gearbox 31. In other embodiments, the generator shaft 29 may be rotatably coupled directly to the rotor shaft 27 or the generator 25 may be directly rotatably coupled to the rotor shaft 27 (often referred to as a "direct-drive wind turbine").

The wind turbine 10 may include numerous slewing ring bearings for allowing rotation of various components of the wind turbine 10. For example, it should be appreciated that, as used herein, the term "slewing ring bearing" may be used to refer to a yaw bearing 35 and/or the pitch bearings 50 of the wind turbine 10. Similarly, it should be appreciated that the slewing ring bearings 35, 50 may generally have any suitable configuration, including one or more of the bearing configurations described below.

The wind turbine 10 may include one or more yaw drive mechanisms 33 mounted to and/or through a bedplate 15 positioned atop the wind turbine tower 12. Specifically, each yaw drive mechanism 33 may be mounted to and/or through the bedplate 15 so as to engage the yaw bearing 35 coupled between the bedplate 15 and the tower 12 of the wind turbine 10. The yaw bearing 35 may be mounted to the bed plate 15 such that, as the yaw bearing 35 rotates about a yaw axis (not shown) of the wind turbine 10, the bedplate 15 and, thus, the nacelle 14 are similarly rotated about the yaw axis. It should be appreciated that, although the illustrated wind turbine 10 is shown as including two yaw drive mechanisms 232, the wind turbine 10 may generally include any suitable number of yaw drive mechanisms 232.

Referring to FIGS. 2 and 3, the wind turbine 10 includes a pitch bearing 50 coupled between the hub 18 and each one of the rotor blades 20. The pitch bearings 50 are configured to allow each rotor blade 20 to be rotated about its pitch axis 39 (e.g., via a pitch adjustment mechanism 45), thereby allowing the orientation of each blade 20 to be adjusted relative to the direction of the wind.

The pitch adjustment mechanism 45 may include a pitch drive motor 37 (e.g., an electric motor), a pitch drive gearbox 41, and a pitch drive pinion 43. In such an embodiment, the pitch drive motor 37 is coupled to the pitch drive gearbox 41 so that the motor 37 imparts mechanical force to the gearbox 41. Similarly, the gearbox 41 is coupled to the pitch drive pinion 43 for rotation therewith. The pinion 43 may, in turn, be in rotational engagement with the inner race 54.

Referring again to FIG. 3, the pitch bearing 50 includes an outer bearing race 52, an inner bearing race 54, and a plurality of line contact rolling elements 56, 57, and 58 (e.g., an upper line of rolling elements 56, middle line of rolling elements 57, and lower line of rolling elements 58) disposed between the outer and inner races 52, 54. It should be understood that the rolling elements 56, 57, and 58 may be balls instead of the cylindrical bodies depicted in the figures. The invention is not limited to any particular construction or type of rolling bodies. As described in greater detail below either of the inner 54 and outer 52 bearing races may be uniquely configured in accordance with aspects of the invention. In the embodiment depicted in FIG. 3, the outer race 52 is a "hub race" in that it is configured to be mounted to a hub flange 60 of the hub 18 using a plurality of hub bolts 62 and/or other suitable fastening mechanisms. Similarly, the inner race 54 is a "blade race" in that it mounts to the blade root 22 using the root bolts 44 of the root attachment assemblies 40. Each root bolt 44 extends between a first end 64 and a second end 66, the first end 64 to the inner race 54 using an attachment nut and/or other suitable fastening mechanism and the second end 66 coupled to the blade root 22 via the barrel nut 42 of each root attachment assembly 40.

Figure 4A:
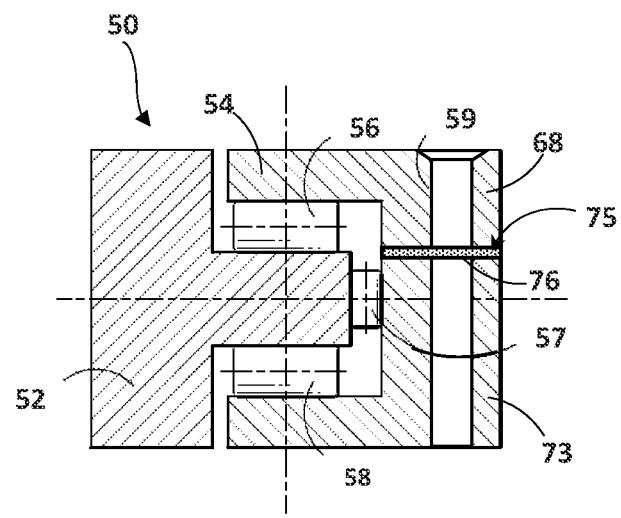
FIG. 4a illustrates a pitch bearing in accordance with aspects of the present invention.

Referring now to FIG. 4a, a partial, cross-sectional view is provided of a pitch bearing 50 according to the present disclosure. In this embodiment, the inner race 54 is a "split race" in that it is formed by first 68 and second 73 ring components. The first ring component 68 has an inner annular face 70, and the second ring component 73 has an inner annular face 74 (see FIG. 5a). When the first 68 and second 73 ring components are joined together to form the inner race 54, the annular faces 70, 74 are opposed and against each other. The first 68 and second 73 ring components are joined together by the root bolts 44 that extend through the aligned bolt holes 59 in the components such that a friction enhancing interface 75 is provided between the components 68, 73 at the opposed annular faces 70, 74.

Figure 4B:
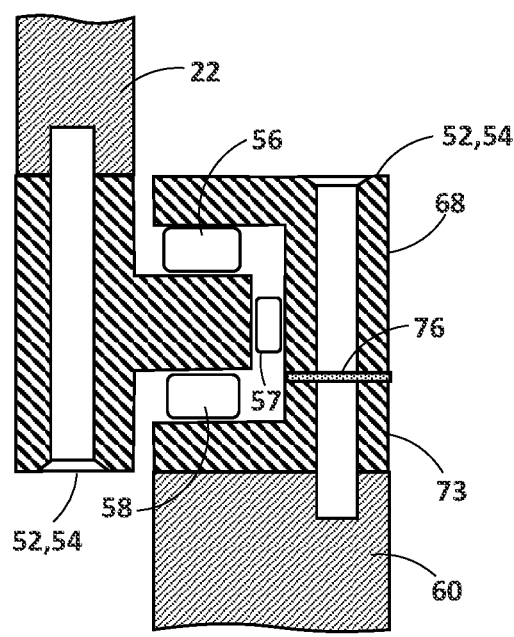
FIG. 4b illustrates another embodiment of a pitch bearing in accordance with the invention.
Figure 4C:
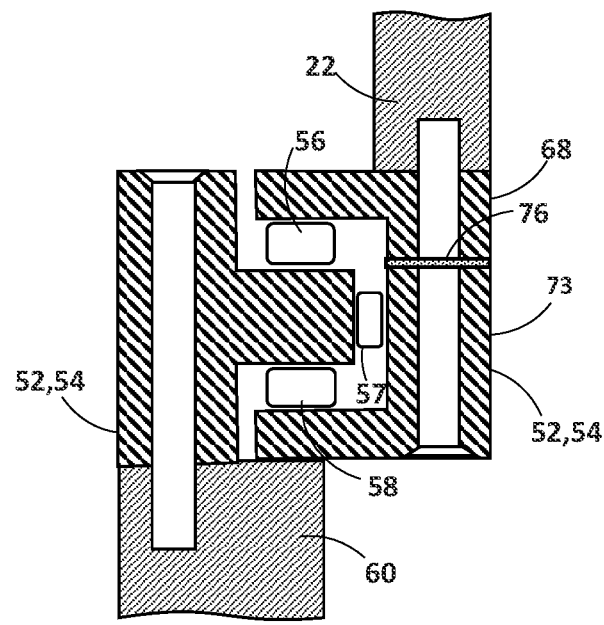
FIG. 4c illustrates still another embodiment of a pitch bearing in accordance with the invention.

The invention is not limited to which one of the inner race 54 or outer race 52 constitutes the split race, or which of the races constitutes the blade race or the hub race. For example, in the embodiment of FIG. 4b, the outer race 52 is the blade race and the inner race 54 is the hub race and is also the split race in that it is formed by the first 68 and second 73 ring components. Alternatively, the inner race 54 is the blade race and the outer race 52 is the hub race and is also the split race in that it is formed by the first 68 and second 73 ring components. In the embodiment of FIG. 4c, the outer race 52 is the hub race and the inner race 54 is the blade race and is also the split race in that it is formed by the first 68 and second 73 ring components. Alternatively, the outer race 52 is the blade race and the inner race 54 is the hub race and is also the split race in that it is formed by the first 68 and second 73 ring components.

As seen in the embodiments of FIGS. 4a-4c and 5a-5b, a layer of friction enhancing material 76 is inserted/located between the opposed annular faces 70, 74. This material 76 significantly increases the frictional interface (e.g., increases the coefficient of friction) between the components 68, 73 and minimizes the problems caused by relative slippage between the components 68, 73 discussed above. The material layer 76 includes particles having a hardness such that they essentially embed in the surfaces of the annular faces 70, 74. The particles have a shear strength so as to resist the tendency for slip, thereby increasing friction between the annular faces 70, 74. These particles can be carried or delivered in various ways.

For example, as depicted in FIG. 5, the layer of friction enhancing material may be provided by a substrate 80 (e.g., a paper, metal, or plastic sheet) pre-impregnated or coated with abrasive particles 78 (FIG. 6) on both sides thereof (similar to double-sided sandpaper or sanding discs). The particles may be coated on only one side of the substrate if they are large enough to penetrate through the substrate when the components 68, 73 are clamped together. A number of commercially available products may be used for this purpose, including a tear-resistant paper coated on both sides with silicon carbide, diamond, or alumina particles.

Figure 6:
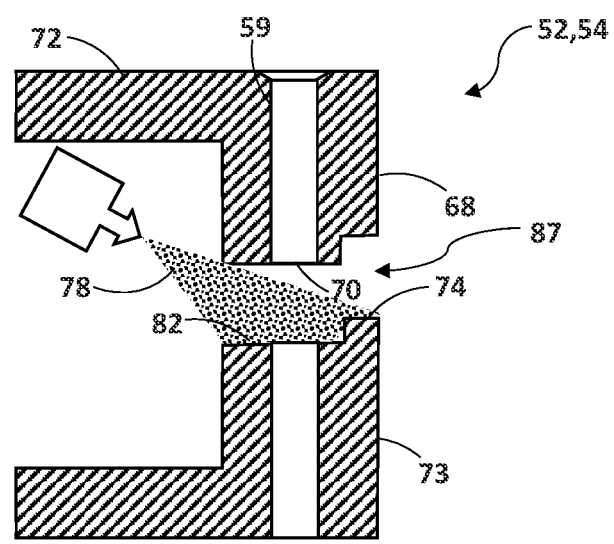
FIG. 6 illustrates another embodiment of a pitch bearing in accordance with aspects of the present invention.

In an alternate embodiment depicted in FIG. 6, the layer of friction enhancing material 76 is formed by a sprayed-on or coated-on layer 82 applied to one or both of the opposed inner annular faces. For example, any one of a suitable number of commercially available friction coatings that contain abrasive or hard particulates may be sprayed or coated onto the annular surfaces and allowed to dry/cure before the ring components are joined together to form the inner race. Drying may not be necessary for certain types of coating before the ring components are joined together. Commercial coatings are available with diamond particles in various size ranges and concentrations. Selection of the particle sizes and concentrations cans be readily determined by those skilled in the art depending factors such as hardness of the annular face material, hardness of the particles, degree of increased friction desired, clamping pressure between the components 68, 73, and so forth. Coating, spraying, and plating techniques for applying the coated-on layer 82 are well-known.

Figure 7:
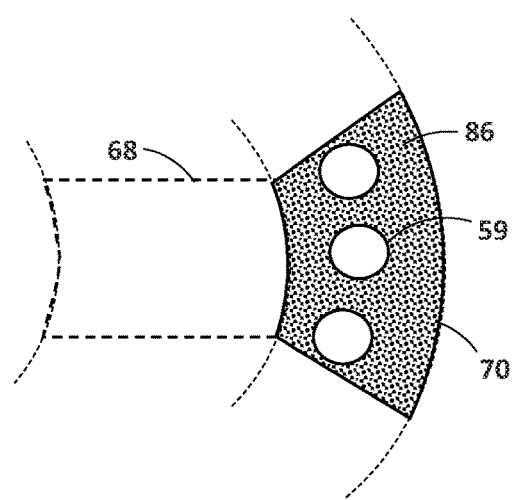
FIG. 7 illustrates still a different embodiment of a pitch bearing in accordance with aspects of the present invention.
Figure 8:
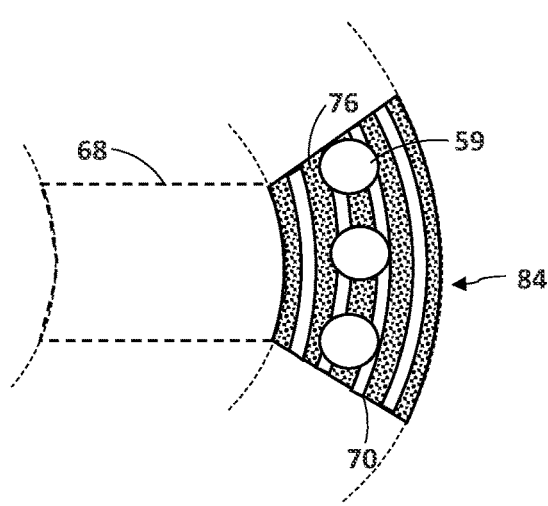
FIG. 8 illustrates an additional embodiment of a pitch bearing in accordance with aspects of the present invention.
Figure 9:
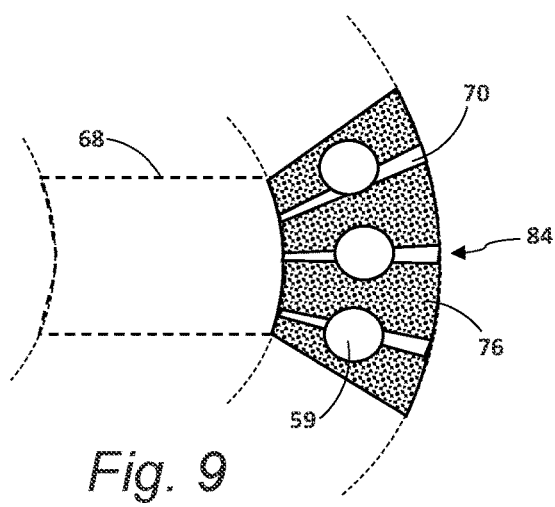
FIG. 9 illustrates still a further embodiment of a pitch bearing in accordance with aspects of the present invention.

Referring to FIG. 7, the layer of friction enhancing material 76 may be applied/inserted so as to completely cover the surface area of the opposed annular faces 70, 74. In an alternate embodiment depicted in FIG. 8, the layer of friction enhancing material 76 may be applied/inserted in a discontinuous pattern 84 such that at least a portion of the opposed annular faces 70, 74 is without the friction enhancing material therebetween. FIG. 8 depicts the discontinuous pattern 84 as circumferential rings. FIG. 9 depicts the discontinuous pattern 84 as radially separate bands.

Figures 5A, 5B:
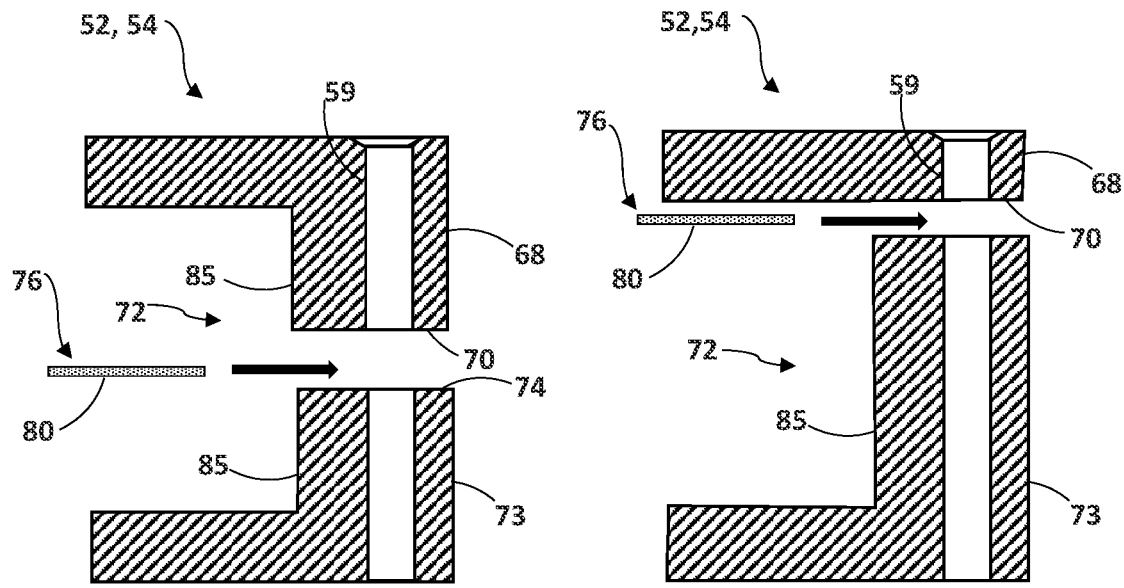
FIG. 5a illustrates an alternate embodiment of a pitch bearing in accordance with aspects of the present invention.
FIG. 5b illustrates a further embodiment of a pitch bearing in accordance with aspects of the present invention.

The pitch bearing 50 may be formed by various configurations of the ring components 68, 73. In a particular embodiment illustrated in FIG. 5a, each of the first and second ring components 68, 73 is an L-shaped component, wherein the annular face 70, 74 is defined at the end of one of the legs 85 of the L-shaped component. When joined at the annular faces 70, 74, the ring components 68, 73 define a cavity 72 for the rolling bodies 56, 57, 58 between the inner and outer races, as seen in FIGS. 4a-4c. In the embodiment of FIG. 5b, one of the components (e.g., second ring component 73) has a L-shaped profile while the other component (e.g., first ring component 68) has an essentially flat plate profile. When joined together, the components 68, 73 also define the cavity 72.

FIG. 6 depicts an embodiment wherein each of the ring components 68, 73 has an L-shaped profile. In addition, the opposed annular faces 70, 74 also have a stepped profile. Each surface of the stepped profile may be provided with the friction enhancing material, such as the sprayed-on coating 82.

Referring to FIG. 7, in certain embodiments, the friction enhancing interface may be provided by a roughened surface 86 defined into one or both of the opposed annular faces 70, 74 by any conventional means such as cutting, laser-etching grit-blasting, etc. On a micro or macroscopic level, the roughened surface 86 may have a random pattern or designed (regular) pattern of depressions and elevations ("peaks and valleys that provide the desired degree of increased friction and resistance to slip between the components 68, 73. The roughened surfaces 86 may be used alone in certain embodiments or may be used to augment the friction enhancing material 76 in other embodiments.

The present invention also encompasses a wind turbine 10 (FIG. 1) having one or more rotor blades 20 coupled to a hub 18 via a pitch bearing 50. The pitch bearing 50 is configured in accordance with one of the embodiments discussed above.

Further aspects of the invention are provided by the subject matter of the following clauses:

Clause 1. A pitch bearing for coupling a rotor blade to a hub of a wind turbine, the pitch bearing comprising:
an outer race;
an inner race;
one of the inner race or the outer race being a hub race configured to be coupled to the hub and the other of the inner race or the outer race being a blade race configured to be coupled to the rotor blade;
one of the inner race or the outer race being a split race comprising first and second ring components joined together at opposed annular faces thereof; and
a friction enhancing interface between the opposed annular faces that increases a coefficient of friction to minimize slippage between the first and second ring components, the friction enhancing interface formed by a surface characteristic of one or both of the opposed annular faces or a layer of friction enhancing material inserted between the opposed annular faces comprising a particulate component.

Clause 2. The pitch bearing as in Clause 1, wherein the layer of friction enhancing material comprises a substrate inserted between the opposed annular faces, the substrate comprising the particulate component applied to opposite sides thereof.

Clause 3. The pitch bearing as in Clause 1, wherein the layer of friction enhancing material is a sprayed, painted, or coated-on layer applied to one or both of the opposed annular faces.

Clause 4. The pitch bearing as in Clause 1, wherein the layer of friction enhancing material completely covers the opposed annular faces.

Clause 5. The pitch bearing as in Clause 1, wherein the layer of friction enhancing material comprises a discontinuous pattern such that at least a portion of the opposed annular faces is without the friction enhancing material therebetween.

Clause 6. The pitch bearing as in Clause 1, wherein the surface characteristic is a roughened surface defined into one or both of the opposed annular faces, the roughened surface comprising peaks and valleys that provide the desired degree of increased coefficient of friction.

Clause 7. The pitch bearing as in Clause 1, wherein the first and second ring components define a channel-shaped cavity.

Clause 8. The pitch bearing as in Clause 7, wherein each of the first and second ring components is an L-shaped component, the opposed annular faces defined at opposed legs of the L-shaped components.

Clause 9. The pitch bearing as in Clause 7, wherein one of the first or second ring components is an L-shaped component and the other of the first or second ring component is a flat component.

Clause 10. The pitch bearing as in Clause 1, comprising a stepped profile between the opposed annular faces.

Clause 11. The pitch bearing as in Clause 1, wherein the inner race is the split race and the hub race or the blade race.

Clause 12. The pitch bearing as in Clause 1, wherein the outer race is the split race and the hub race or the blade race.

Clause 13. A wind turbine, comprising:
a plurality of rotor blades coupled to a hub;
a pitch bearing arranged at each of the rotor blades to couple the rotor blade to the hub;
the pitch bearing comprising:
an outer race;
an inner race;
one of the inner race or the outer race being a hub race configured to be coupled to the hub and the other of the inner race or the outer race being a blade race configured to be coupled to the rotor blade;
one of the inner race or the outer race being a split race comprising first and second ring components joined together at opposed annular faces thereof; and
a friction enhancing interface between the opposed annular faces that increases a coefficient of friction to minimize slippage between the first and second ring components, the friction enhancing interface formed by a surface characteristic of one or both of the opposed annular faces or a layer of friction enhancing material inserted between the opposed annular faces comprising a particulate component.

Clause 14. The wind turbine as in Clause 13, wherein the layer of friction enhancing material comprises a substrate inserted between the opposed annular faces, the substrate comprising the particulate component applied to opposite sides thereof.

Clause 15. The wind turbine as in Clause 13, wherein the layer of friction enhancing material is a sprayed, painted, or coated-on layer applied to one or both of the opposed annular faces.

Clause 16. The wind turbine as in Clause 13, wherein the layer of friction enhancing material comprises a discontinuous pattern such that at least a portion of the opposed annular faces is without the friction enhancing material therebetween.

Clause 17. The wind turbine as in Clause 13, wherein the surface characteristic is a roughened surface defined into one or both of the opposed annular faces, the roughened surface comprising peaks and valleys that provide a desired degree of the increased coefficient of friction.

Clause 18. The wind turbine as in Clause 13, comprising a stepped profile between the opposed annular faces.

Clause 19. The wind turbine as in Clause 13, wherein the inner race is the split race and the hub race or the blade race.

Clause 20. The wind turbine as in Clause 13, wherein the outer race is the split race and the hub race or the blade race.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch bearing for coupling a rotor blade to a hub of a wind turbine, the pitch beating comprising:
   an outer race;
   an inner race;
   one of the inner race or the outer race being a huh race configured to be coupled to the hub and the other of the inner race or the outer race being a blade race configured to be coupled to the rotor blade;
   one of the inner race or the outer race being a split race comprising first and second ring components joined together at opposed annular faces thereof; and
   a friction enhancing interface between the opposed annular faces that increases a coefficient of friction to minimize slippage between the first and second ring components, the friction enhancing interface formed by a layer of friction enhancing material inserted between the opposed annular faces comprising a particulate component, wherein the layer of friction enhancing material is a sprayed, painted, or coated-on layer applied to one or both of the opposed annular faces.

2. The pitch bearing as in claim 1, wherein the layer of friction enhancing material completely covers the opposed annular faces.

3. The pitch bearing as in claim 1, wherein the layer of friction enhancing material comprises a discontinuous pattern such that at least a portion of the opposed annular faces is without the friction enhancing material therebetween.

4. The pitch bearing as in claim 1, wherein the first and second ring components define a channel-shaped cavity.

5. The pitch bearing as in claim 4, wherein each of the first and second ring components is an L-shaped component, the opposed annular faces defined at opposed legs of the L-shaped components.

6. The pitch bearing as in claim 4, wherein one of the first or second ring components is an L-shaped component and the other of the first or second ring component is a flat component.

7. The pitch bearing as in claim 1, comprising a stepped profile between the opposed annular faces.

8. The pitch bearing as in claim 1, wherein the inner race is the split race.

9. The pitch bearing as in claim 1, wherein the outer race is the split race.

10. A wind turbine, comprising:
    a plurality of rotor blades coupled to a hub;
    a pitch bearing arranged at each of the rotor blades to couple the rotor blade to the hub;
    the pitch bearing comprising:
    an outer race;
    an inner race;
    one of the inner race or the outer race being a hub race configured to be coupled to the hub and the other of the inner race or the outer race being a blade race configured to be coupled to the rotor blade;
    one of the inner race or the outer race being a split race comprising first and second ring components joined together at opposed annular faces thereof; and
    a friction enhancing interface between the opposed annular faces that increases a coefficient of friction to minimize slippage between the first and second ring components, the friction enhancing interface formed by a layer of friction enhancing material inserted between the opposed annular faces comprising a particulate component, wherein the layer of friction enhancing material is a sprayed, painted or coated-on layer applied to one or both of the opposed annular faces.

11. The wind turbine as in claim 10, wherein the layer of friction enhancing material comprises a discontinuous pattern such that at least a portion of the opposed annular faces is without the friction enhancing material therebetween.

12. The wind turbine as in claim 10, comprising a stepped profile between the opposed annular faces.

13. The wind turbine as in claim 10, wherein the inner race is the split race.

14. The wind turbine as in claim 10, wherein the outer race is the split race.

15. A pitch bearing for coupling a rotor blade to a hub of a wind turbine, the pitch bearing comprising:
    an outer race;
    an inner race;
    one of the inner race or the outer race being a hub race configured to be coupled to the hub and the other of the inner race or the outer race being a blade race configured to be coupled to the rotor blade;
    one of the inner race or the outer race being a split race comprising first and second ring components joined together at opposed and directly contacting annular faces thereof; and
    a friction enhancing interface between the opposed annular faces that increases a coefficient of friction to minimize slippage between the first and second ring components, the friction enhancing interface formed by a surface characteristic that is machined, etched, or blasted into one or both of the opposed annular faces to define a regular or irregular pattern of peaks and valleys in the annular face.

16. A wind turbine, comprising:
    a plurality of rotor blades coupled to a hub; and
    the pitch bearing according to claim 15 arranged at each of the rotor blades to couple the rotor blade to the hub.

* * * * *